United States Patent
Horlander

(10) Patent No.: US 6,801,246 B2
(45) Date of Patent: Oct. 5, 2004

(54) METHOD AND APPARATUS FOR DETECTING CHANGE IN VIDEO SOURCE MATERIAL

(75) Inventor: Karl Francis Horlander, Indianapolis, IN (US)

(73) Assignee: Thomson Licensing, S.A., Boulogne-Billancourt (FR)

( * ) Notice: Subject to any disclaimer, the term of this patent is extended or adjusted under 35 U.S.C. 154(b) by 778 days.

(21) Appl. No.: 09/725,432

(22) Filed: Feb. 27, 2001

(65) Prior Publication Data

US 2002/0118045 A1 Aug. 29, 2002

(51) Int. Cl.[7] .......................... H04N 17/00; H04N 5/04
(52) U.S. Cl. .................. 348/194; 348/500; 348/537; 348/542
(58) Field of Search ............................... 348/536, 500, 348/537, 540, 542, 543, 544, 547, 193, 194; 375/354, 362, 373, 376; H04N 17/00, 5/04

(56) References Cited

U.S. PATENT DOCUMENTS

| | | |
|---|---|---|
| 4,774,570 A | 9/1988 | Araki |
| 5,130,879 A | 7/1992 | Weiley |
| 5,557,417 A | 9/1996 | Ishii |
| 5,576,738 A | 11/1996 | Anwyl et al. |
| 5,654,772 A | 8/1997 | Mester et al. |
| 5,880,775 A | 3/1999 | Ross |
| 6,009,131 A | * 12/1999 | Hiramatsu ................. 375/354 |
| 6,040,871 A | * 3/2000 | Andersson ................. 348/540 |
| 6,049,358 A | * 4/2000 | Jun ........................... 348/542 |

FOREIGN PATENT DOCUMENTS

| | | |
|---|---|---|
| EP | 0261917 | 3/1988 |
| EP | 0543148 | 5/1993 |
| EP | 0584925 | 3/1994 |
| EP | 0645691 | 3/1995 |
| EP | 0649251 | 4/1995 |
| EP | 0654947 | 5/1995 |

* cited by examiner

*Primary Examiner*—Sherrie Hsia
(74) *Attorney, Agent, or Firm*—Joseph S. Tripoli; Joseph J. Laks; Joseph J. Kolodka

(57) ABSTRACT

A signal processing method and apparatus in which a horizontal and/or vertical synchronizing signal related to a received video signal is monitored to determine if a relatively large change has occurred in the respective vertical and/or horizontal time period such that a change in video signal source may have occurred. Upon the detection of such a change, the operation of a phase lock loop (PLL) such as horizontal phase lock loop (HPLL) and/or vertical phase lock loop (VPLL) circuit is adapted as appropriate.

12 Claims, 6 Drawing Sheets

METHOD AND APPARATUS FOR DETECTING CHANGE IN VIDEO SOURCE MATERIAL

CROSS REFERENCE TO RELATED APPLICATIONS

This application is related to U.S. patent application Ser. No. 09/725,439, filed Nov. 29, 2000 (Attorney Docket No. PU000142) which is incorporated herein by reference in its entirely.

BACKGROUND OF THE INVENTION

1. Field of the Invention

The invention relates to television signal processing arrangements generally and particularly to those television signal processing arrangements utilizing timing signals.

2. Description of the Prior Art

In a television signal receiver, such as a television set, a video cassette recorder (VCR), a computer video input card and the like, synchronization using a phase lock loop (PLL) is often required. The PLL is used to adapt at least a portion of the timing circuitry within the video receiver according to synchronization (SYNC) pulses, such as vertical and/or horizontal SYNC PULSES within a received television or video signal.

A horizontal SYNCH pulse (HPLL) circuit may operate in one of a slow response loop mode or a fast response loop mode. The slow response loop mode is appropriate where a received video source signal has a relatively poor signal-to-noise ratio (SNR), such as provided by an antenna receiving a broadcast video signal. The fast response loop mode is appropriate where the received video source signal has a relatively good SNR ratio, such as from a video tape, video disk, computer video output or other source providing a relatively well conditioned video source signal.

Where a television receiver receives a video signal from a plurality of sources including both poor and good SNR, it becomes necessary to adjust the operating mode of the HPLL in response to the video source employed.

Therefore, it is seen to be desirable to provide a method and apparatus for detecting changes in video source material. More specifically, it is seen to be desirable to adapt the operation of a synchronizing phase lock loop in response to changes in video source material.

SUMMARY OF THE INVENTION

The subject invention concerns a signal processing method and apparatus in which a horizontal and/or vertical synchronizing signal related to a received video signal is monitored to determine if a relatively large change has occurred in the respective vertical and/or horizontal time period such that a change in video signal source may have occurred. Upon the detection of such a change, the operation of a phase lock loop (PLL) such as horizontal phase lock loop (HPLL) and/or vertical phase lock loop (VPLL) circuit is adapted as appropriate.

Apparatus, including a timer, for associating temporal information with each of a sequence of received synchronization pulses; a first differencer, for measuring temporal differences between successive synchronization pulses to determine respective synchronization pulse timing intervals; a second differencer, for measuring temporal differences between successive synchronization pulse timing intervals; and a comparator, for producing a control signal indicative of whether differences between successive synchronization pulse timing intervals exceed a threshold level.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a television receiver operating according to the National Television Standards Committee (NTSC) standards. It will be appreciated by those skilled in the art that the invention is applicable to other television standards, such as the Phase Attenuating Line (PAL) and Sequential Color With Memory (SECAM) standards. Moreover, it will be appreciated by those skilled in the art that the invention is applicable to any signal including periodically occurring synchronizing components wherein perturbations in the periodicity of the synchronizing components may reasonably be construed as changes in signal sourcing.

The present invention operates to detect changes in temporal spacing of synchronizing pulses, such as vertical and/or horizontal synchronizing pulses within a television signal. This change indicates a change in source material such as occurs when the television receiver switches from a first source to a second source. Such a change may comprise, for example, a gross change in the time period associated with the vertical synchronizing signal (on the order of several horizontal periods). In the event of such a change, several events may have occurred. For example, a tape source presently providing a television signal may have changed to a received broadcast or off-air source. Similarly, a VCR providing a source signal is placed into a trick mode of operation (e.g., fast play, fast forward or rewind modes), a tape played via the VCR has been stopped, such that the VCR is now providing an off-air signal. A television input/output system has changed sources.

Figure 1:
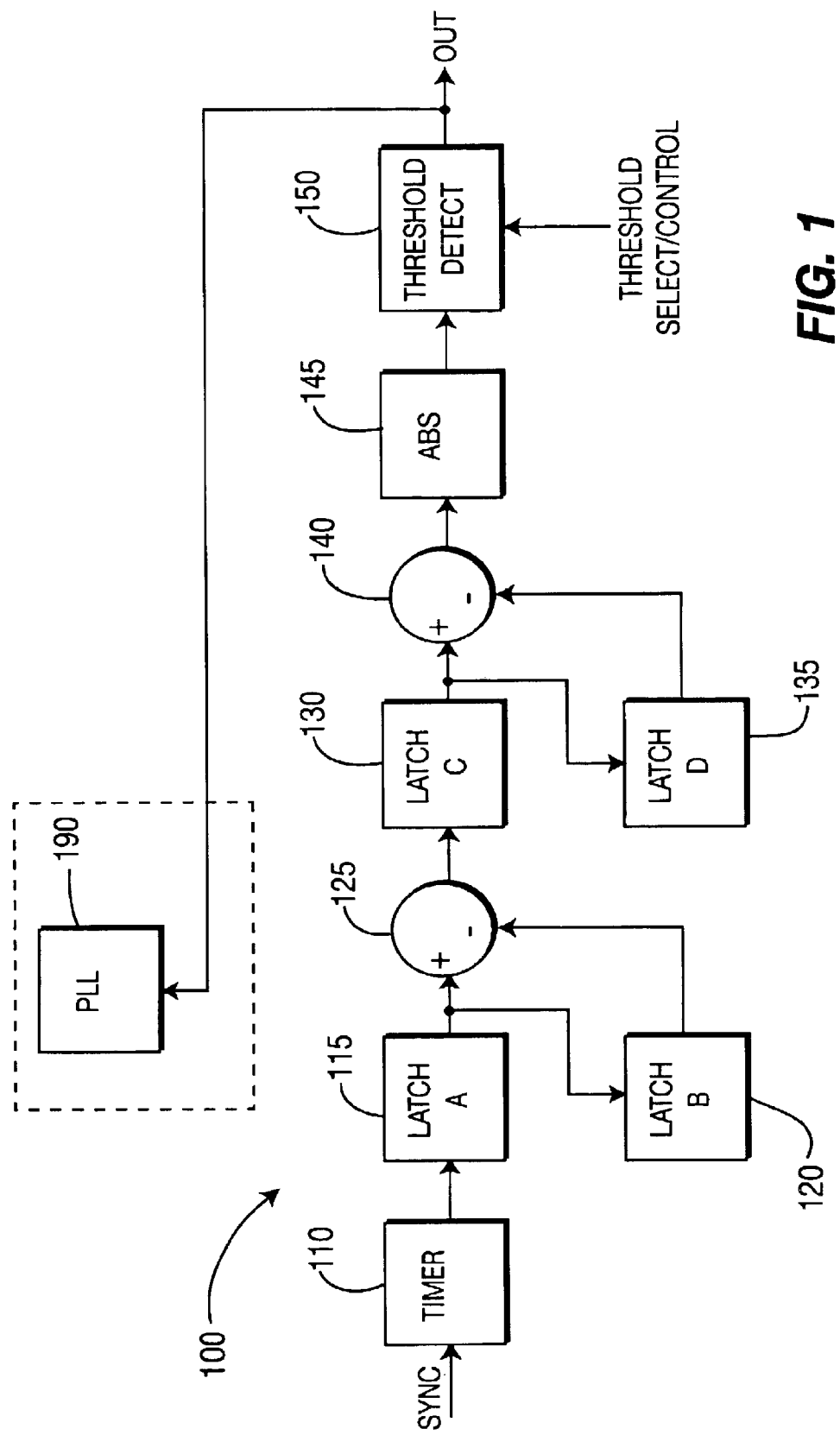
FIG. 1 is a block diagram of a detector according to an embodiment of the invention.

Upon detection of a change in, for example, vertical synchronization rates, the operation of a phase lock loop, digitizer, or other functional element within the television receiver is re-initialized to optimize performance based upon the type of source material likely to have caused the detected change. FIG. 1 depicts a block diagram of a detector according to an embodiment of the invention. Specifically, the detector 100 of FIG. 1 comprises a timer 110, four latches 115, 120, 130 and 135, two subtractors 125 and 140, an absolute value circuit 145 and a threshold detector 150. The detector 100 of FIG. 1 processes a received synchronizing signal (SYNC) to produce an output signal (OUT) indicative of changes in the temporal spacing of synchronizing pulses, such as vertical and/or horizontal synchronizing pulses, beyond a threshold level. The output signal OUT is provided to a phase lock loop (PLL) 190 which responsively adapts its operation to select, for example, one of a slow response loop mode and a fast response loop mode.

The detector 100 of FIG. 1 associates temporal information with each of a sequence of received synchronization pulses, measures a temporal difference between successive synchronization pulses to determine respective synchronization pulse timing intervals, measures temporal differences between successive synchronization pulse timing intervals and produces a control signal (OUT) indicative of whether differences between successive synchronization pulse timing intervals exceed a threshold level.

The synchronizing signal SYNC is provided to the timer circuit 110. The synchronizing signal comprises a signal representative of the horizontal and/or vertical synchronizing pulses associated with a video signal. The synchronizing signal SYNC may be extracted from a received video signal by a standard SYNC separation circuit (not shown).

The timer 110 provides a timing output word to the first latch 115 in response to the received SYNC signal. The timing output word is latched into the first latch 115 on, for example, the occurrence of a positive (or negative) edge of the received SYNC pulse. Thus, the first latch 115 is used to store a time associated with a presently received SYNC pulse. The stored time within first latch 115 is coupled to an addend input of subtractor 125 and an input of second latch 120.

Second latch 120 stores the timing word provided by first latch 115 upon the occurrence of the next timing edge of the received SYNC pulse. Thus, second latch B is used to store the timing word associated with the SYNC pulse immediately preceding the presently received SYNC pulse (stored in first latch 115). The timing word stored in the second latch 120 is coupled to the subtrahend input of subtractor 125.

Subtractor 125 subtracts the timing word associated with the preceding SYNC pulse (stored in second latch 120) from the timing word associated with the present SYNC pulse (stored in first latch 115) to produce a timing difference signal. The timing difference signal is stored in third latch 130. Thus, first 115 and second 120 latches along with subtractor 125 form a first differencer.

The timing difference signal provided by the subtractor 125 is latched into the third latch 130 on, for example, the occurrence of a positive (or negative) edge of the received SYNC pulse. Thus, the third latch 130 is used to store a SYNC pulse timing interval between a presently received SYNC pulse and a preceding SYNC pulse. The stored timing interval timing interval within third latch 130 is coupled to an addend input of subtractor 140 and an input of fourth latch 135.

Fourth latch 135 stores the timing interval word provided by third latch 130 upon the occurrence of the next timing edge of the received SYNC pulse. Thus, fourth latch 135 is used to store a word associated with a timing interval preceding the timing interval stored in third latch 130. The timing interval stored in fourth latch 135 is coupled to the subtrahend input of subtractor 140.

Subtractor 140 subtracts the timing interval stored in fourth latch 135 from the timing interval stored in third latch 130 to produce a timing interval difference signal. The timing interval difference signal is coupled to absolute value circuit 145.

Absolute value (ABS) circuit 145 converts the timing interval difference signal into a positive quantity for use by the threshold detector 150. The threshold detector 150 compares the absolute value of the timing interval difference signal produced by subtractor 140 to a threshold level. The threshold level may be predetermined, responsively selected during operation or otherwise controlled such that excursions of the timing interval difference beyond the threshold level indicate that at least one of a vertical and/or horizontal synchronizing signal has been perturbed in a manner indicative of a change in video source material. For example, in the case of measuring horizontal SYNC pulses, where a change in timing intervals associated with a sequence of horizontal SYNC pulses is greater than, for example, two standard timing intervals, a two standard interval threshold level may be set. It is noted that the threshold level may be adapted based on a standard timing interval or dynamically adapted based on timing intervals historically associated with a presently active source.

With respect to timing intervals, it is noted that in the case of a stretched video tape, the timing intervals associated with both horizontal and vertical pulses of a video signal recorded on such stretched magnetic tape will likely have a longer timing interval.

Figure 2:
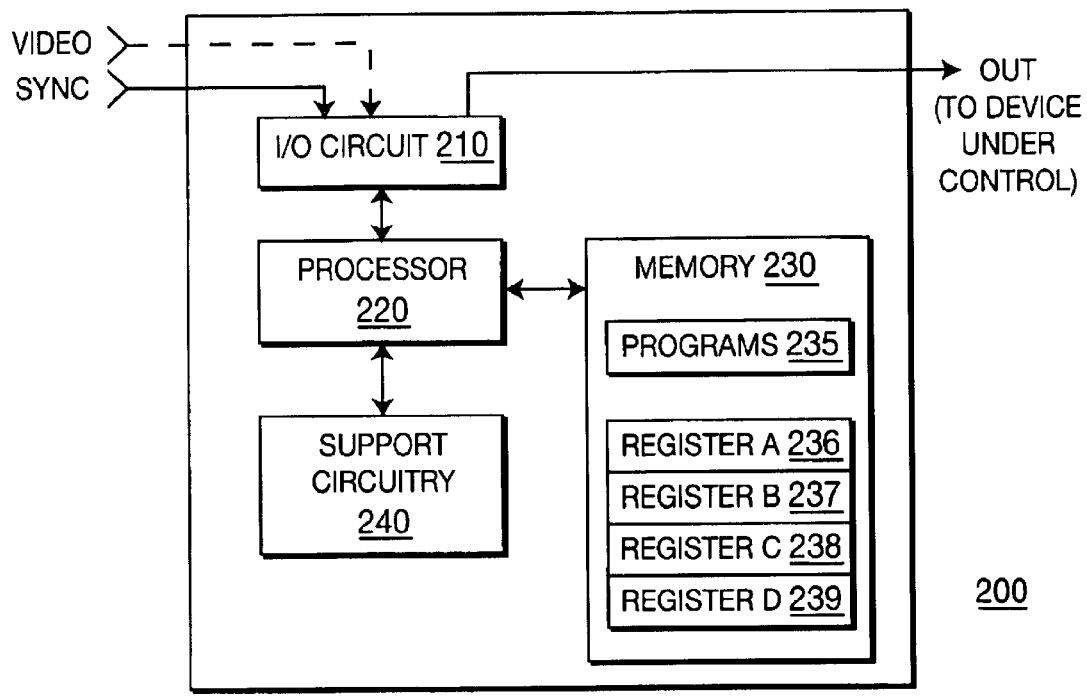
FIG. 2 depicts a high level block diagram of a controller suitable for implementing the functionality of the detector of FIG. 1.

FIG. 2 depicts a high level block diagram of a controller suitable for implementing the functionality of the detector 100 of FIG. 1. Specifically, the controller 200 of FIG. 2 comprises a processor 220 as well as memory 230 for storing various detection and control programs 235 and registers A–D (denoted as 236–239). The processor 220 cooperates with conventional support circuitry 240 such as power supplies, clock circuits, cache memory and the like as well as circuits that assist in executing the software routines stored in the memory 230. As such, it is contemplated that some of the process steps discussed herein as software processes may be implemented within hardware, for example, as circuitry that cooperates with the processor 220 to perform various steps. The controller 200 also contains input/output (I/O) circuitry 210 that forms an interface between the various functional elements required to implement the detector function described above with respect to FIG. 1. For example, the controller 200 of FIG. 2 may be used to replace elements 110–150 of the detector 100 of FIG. 1.

Thus, the controller 200 of FIG. 2 receives a synchronizing signal SYNC associated with a video signal VIDEO received by the television receiver including the controller 200. Optionally, the controller 200 receives the video signal itself. The synchronizing signal may comprise horizontal and vertical synchronizing pulses associated with the received video signal. The controller 200 processes the SYNC signal to produce an output signal OUT indicative of an appropriate operating mode of, for example, a phase lock loop or other device having operational parameters that may be adapted to a change in video signal source.

Although the controller 200 of FIG. 2 is depicted as a general purpose computer that is programmed to perform various detection and processing functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

Figure 3:
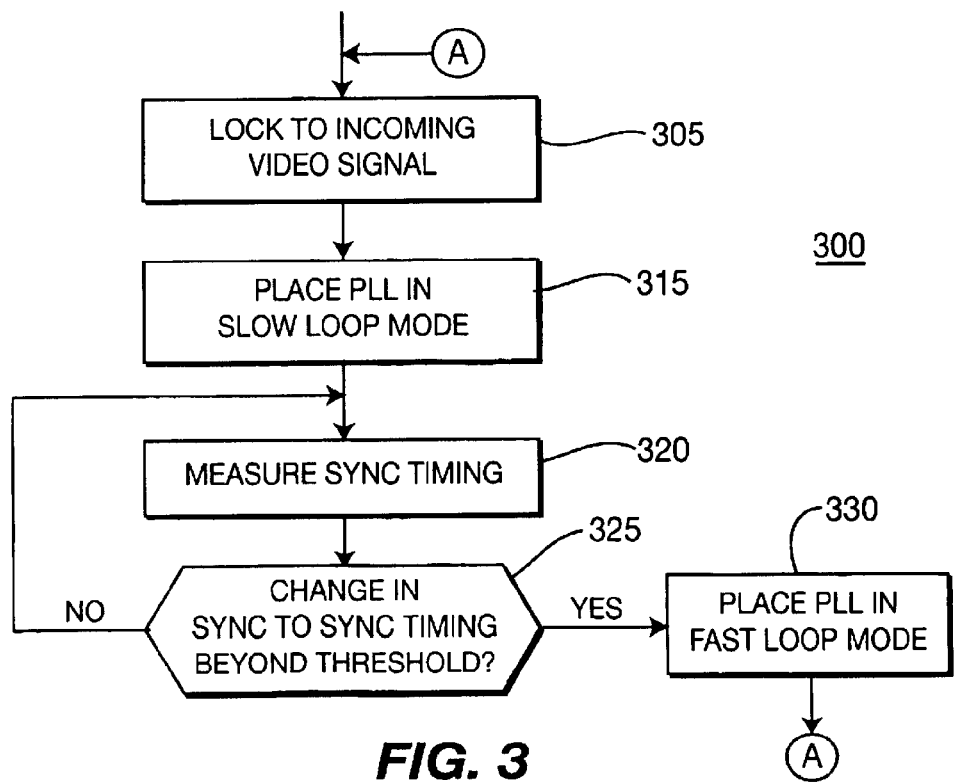
FIG. 3 depicts a flow diagram of a method according to an embodiment of the invention.

FIG. 3 depicts a flow diagram of a method according to an embodiment of the invention. Specifically, the method 300 of FIG. 3 processes information derived from the SYNC and/or video signals provided to the controller 200 of FIG. 2 to produce the output signal OUT indicative of, illustratively, an appropriate phase lock loop (PLL) operating mode to be employed.

At step 305, the controller 200 locks to the incoming video or synchronizing signal SYNC. At step 315, the phase lock loop (e.g., PLL 190) is placed in the slow loop mode associated with effecting a lock to a video signal having a relatively poor signal-to-noise ratio.

At step 320, timing data associated with the horizontal and/or vertical synchronizing signals is measured. The timing data comprises pulse-to-pulse timing intervals, changes between successive timing intervals and other timing data associated with horizontal and/or vertical synchronizing pulses within a video signal.

At step 325, a query is made as to whether changes in the periodicity of the horizontal and/or vertical synchronizing pulses or signals are beyond a threshold level. That is, at step 325, the measured timing parameters of the synchronizing signals from step 320 are used to determine whether the periodicity of other parameters associated with the received synchronizing signal SYNC have changed beyond an allowed threshold level of change.

If the query at step 325 indicates that any timing changes beyond the allowed threshold level have occurred, then at step 330 the phase-lock loop is placed in the fast loop mode, which is the mode appropriate to video signal sources having relatively good signal-to-noise ratio. After changing modes, the method 300 proceeds to step 305 where the incoming signal is again locked, if necessary.

If the query at step 325 indicates that any timing changes are below the threshold level, then the method 300 proceeds to step 320 where the next synchronizing signal period is measured.

It is noted that the method 300 of FIG. 3 assumes that the slow loop mode of operation is appropriate as a default mode of operation. It will be appreciated by those skilled in the art that the fast loop mode of operation may be instead used as a default mode of operation. Moreover, it will be appreciated that an initial step for determining a presently preferred mode of operation may be added to the method 300 of FIG. 3.

Figure 4:
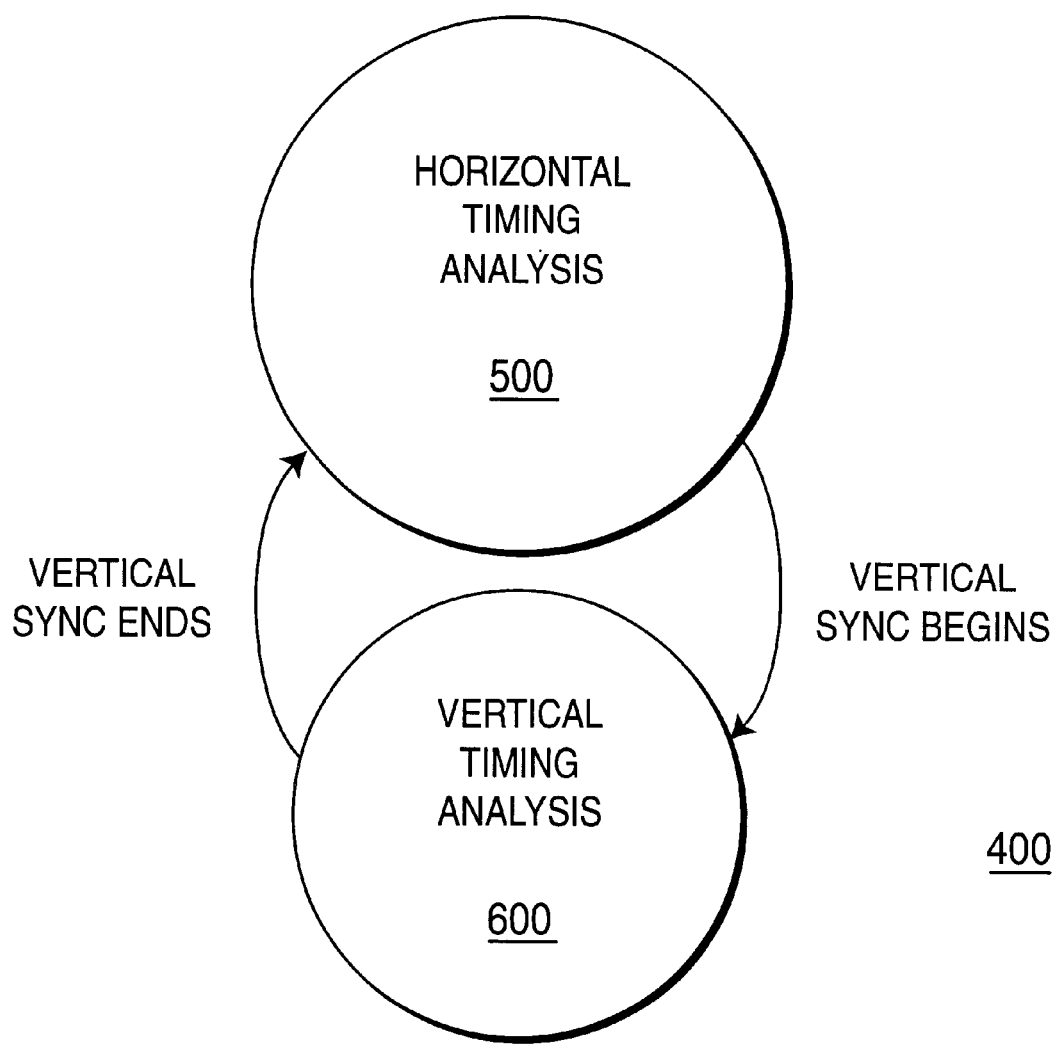
FIG. 4 depicts a state diagram of a timing analysis method suitable for use in the present invention.

FIG. 4 depicts a state diagram of a timing analysis method according to an embodiment of the invention. Specifically, the timing analysis method 400 depicted in FIG. 4 comprises a horizontal timing analysis method 500 and a vertical timing analysis method 600. The horizontal timing analysis method 500 is executed until such time as a vertical SYNC pulse begins. After receiving a vertical SYNC pulse, the vertical timing analysis method 600 operates until the termination of the vertical SYNC pulse, at which time the horizontal timing analysis method 500 is reengaged. The horizontal timing analysis method will be described in more detail below with respect to FIG. 5, while the vertical timing analysis method 600 will be described in more detail below.

The timing analysis method 400 of FIG. 4 utilizes a dual measurement system in which changes detected within two synchronization signals (i.e., horizontal and vertical synchronizing signals) are detected to determine whether video source material has changed. Briefly, changes in the timing interval defined by successive horizontal pulses and/or vertical pulses, changes in the pulse width of horizontal pulses and/or vertical pulses and/or differences between pulse intervals and/or pulse widths from a standard pulse interval or pulse width are indicative of such changes in source material.

The method 400 of FIG. 4 attempts to find the case where horizontal SYNC periods are significantly changed or are out of the bounds, by a threshold amount, of a recognized standard. This insures proper detection of, for example, VCR trick modes of operation, stretched video tape, or other source material changes which result in perturbations of the standard or historical timing intervals of previously received horizontal and/or vertical synchronizing pulses. The method 400 of FIG. 4 also checks for an event where the horizontal timing and/or vertical changes.

Figure 5:
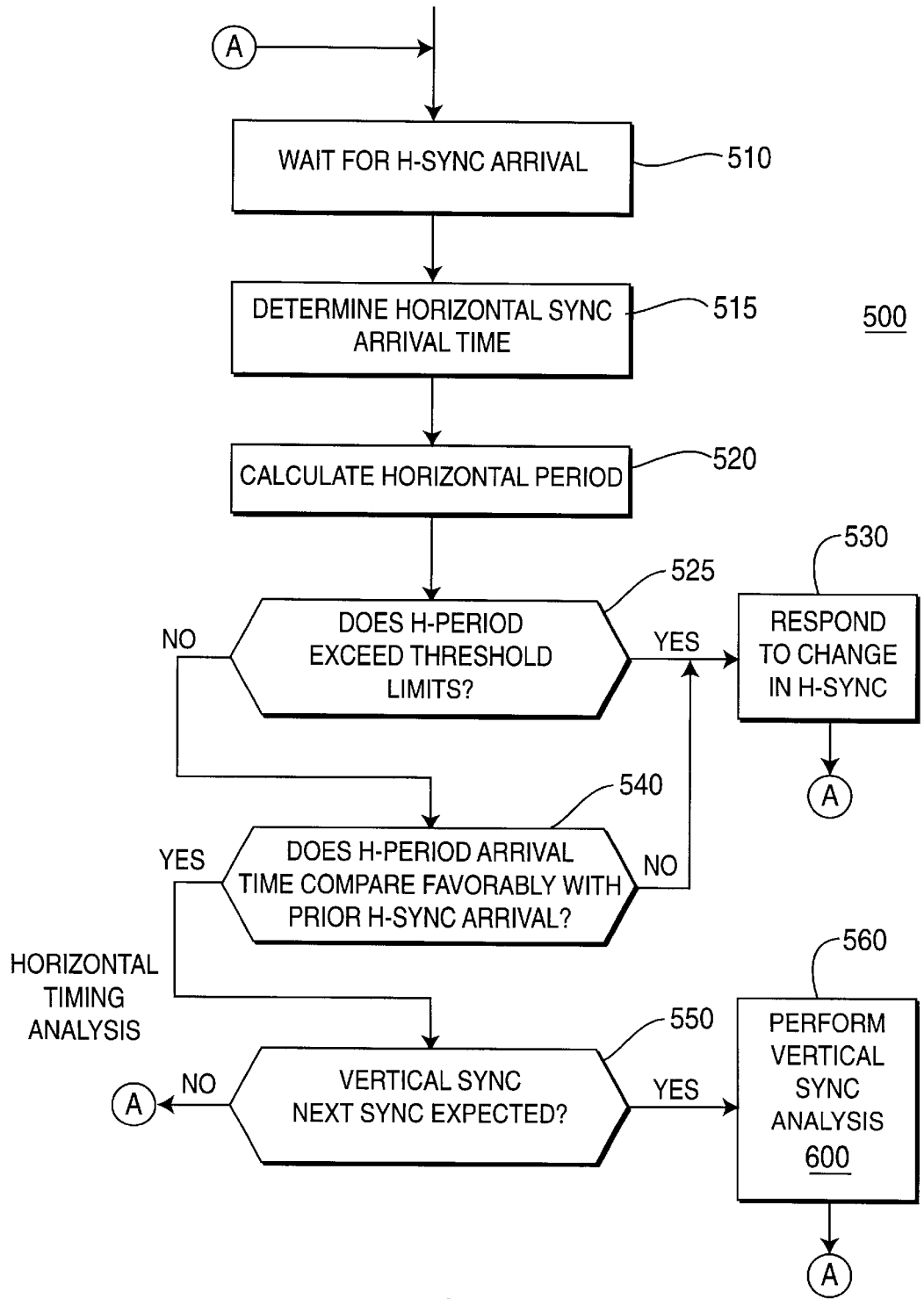
FIG. 5 depicts a horizontal timing analysis method suitable for use in the present invention.

FIG. 5 depicts a horizontal timing analysis method suitable for use in the present invention. Specifically, the horizontal timing analysis method 500 of FIG. 5 may be used to implement the horizontal timing analysis state 500 described above with respect to the method of FIG. 4.

At step 510, the method 500 waits for the arrival of a horizontal SYNC pulse. At step 515, the arrival time of the horizontal SYNC pulse is determined. At step 520, the period of time between the received horizontal SYNC pulse and a previously received horizontal SYNC pulse is calculated.

At step 525, a determination is made as to whether the horizontal SYNC pulse period calculated at step 520 exceeds positive or negative threshold limits. That is, at step 525, the difference between the horizontal SYNC pulse period most recently calculated at step 520 and the horizontal SYNC pulse period previously calculated at step 520 (i.e., the preceding horizontal SYNC pulse period) is determined. If the difference between the two horizontal SYNC pulse periods exceeds a threshold amount of time or period percentage (e.g., 200% or two horizontal periods), then a change in horizontal SYNC timing is deemed to have occurred, and the method 500 proceeds to step 530. If any difference between the horizontal SYNC pulse periods fails to exceed the threshold limits, then the method 500 proceeds to step 540.

At step 540 the arrival time of the most recent horizontal SYNC pulse calculated at step 515 is compared to the arrival time of the immediately preceding horizontal SYNC pulse. That is, at step 540, the difference in arrival times of the two most recently received horizontal SYNC pulses is calculated. If this difference exceeds a threshold level, then a change in horizontal SYNC timing is deemed to have occurred, and the method 500 proceeds to step 530. If no change has occurred, then the method proceeds to step 550.

At step 530, the system responds to changes deemed to have occurred in the horizontal SYNC pulses by, for example, adapting the operating mode of a phase lock loop from a slow mode of operation to a fast mode of operation, or vice versa.

At step 550, a determination is made as to whether a vertical SYNC pulse is the next SYNC pulse expected. If the query at step 550 is entered negatively, then the method 500 proceeds to step 510 to wait for the next horizontal SYNC pulse to arrive. If the query at step 550 is answered affirmatively, then the method 500 proceeds to step 560, where the vertical synchronizing analysis routine 600 is performed. After the execution of the vertical SYNC analysis routine 600, the method 500 proceeds to step 510, to wait for the arrival of the next horizontal SYNC pulse.

Figure 6:
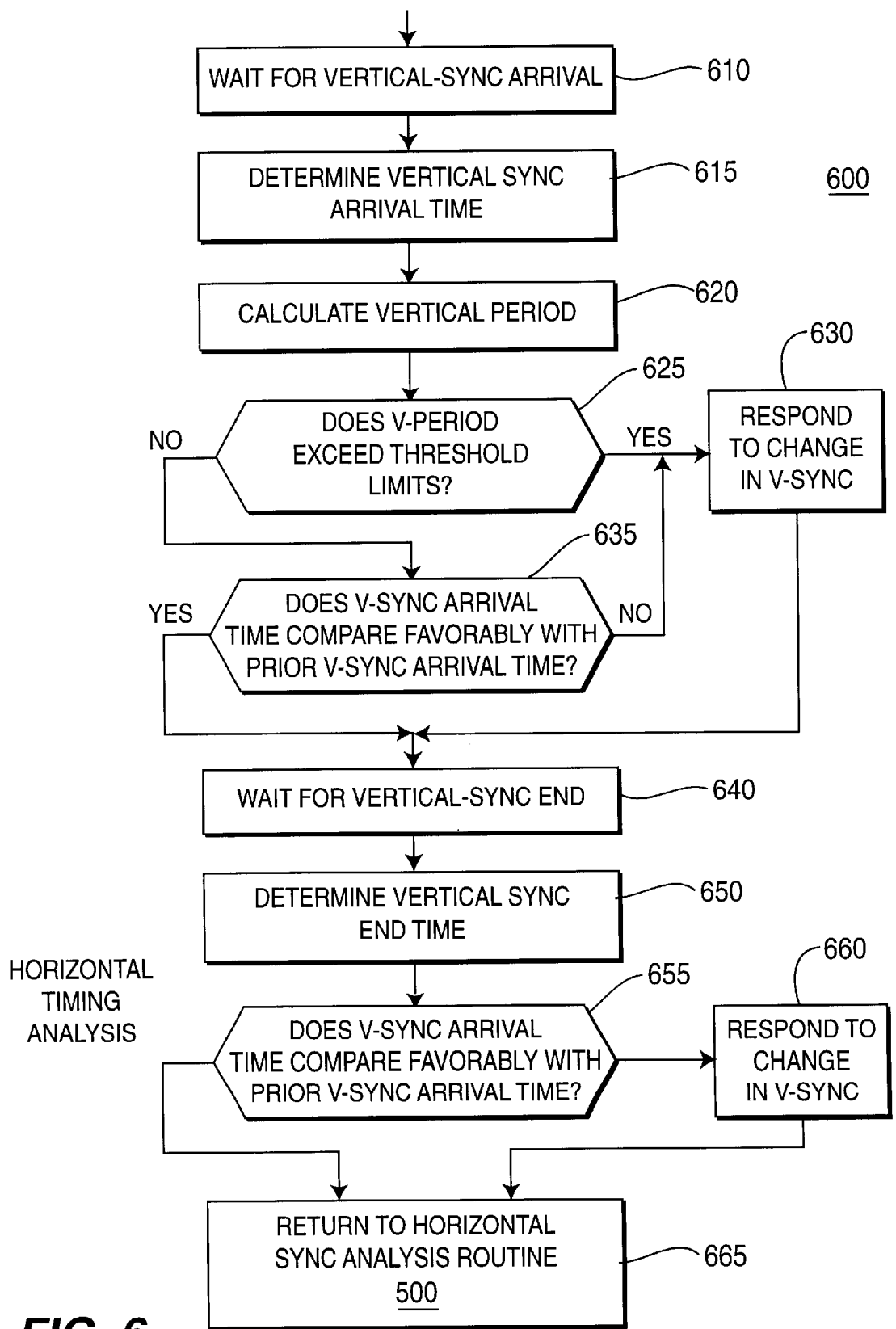
FIG. 6 depicts a vertical timing analysis method suitable for use in the present invention.

FIG. 6 depicts a vertical timing analysis method suitable for use in the present invention. Specifically, the vertical timing analysis method 600 of FIG. 6 may be used to implement the vertical timing analysis state 600 described above with respect to the method 400 of FIG. 4.

At step 610, the method 600 waits for the arrival of a vertical SYNC pulse. The arrival of a vertical SYNC pulse, as noted above with respect to FIG. 4, indicates that a transition between the horizontal timing analysis state 500 and vertical timing analysis state 600 of the method 400 of FIG. 4 should occur. At step 615, the arrival time of the vertical SYNC pulse is determined. At step 620, the period of time between the received vertical SYNC pulse and a previously received vertical SYNC pulse is calculated.

At step 625, a determination is made as to whether the vertical SYNC pulse period calculated at step 620 exceeds positive or negative threshold limits. That is, at step 625, the difference between the vertical SYNC pulse period most recently calculated at step 620 and the vertical SYNC pulse period previously calculated at step 620 (i.e., the preceding vertical SYNC pulse period) is determined. If the difference between the two vertical SYNC pulse periods exceeds a threshold amount of time or period percentage, then a change in vertical SYNC timing is deemed to have occurred, and the method 600 proceeds to step 630. If any difference between the vertical SYNC pulse periods fails to exceed the threshold limits, then the method 600 proceeds to step 635.

At step 635, the arrival time of the most recent vertical SYNC pulse calculated at step 615 is compared to the arrival time of the immediately preceding vertical SYNC pulse. That is, at step 635, the difference in arrival times of the two most recently received vertical SYNC pulses is calculated. If this difference exceeds a threshold level, then a change in vertical SYNC pulse timing is deemed to have occurred, and the method 600 proceeds to step 630. If no change has occurred, then the method proceeds to step 640.

At step 630, the system responds to changes deemed to have occurred in the vertical SYNC pulses by, for example, adapting the operating mode of a device under control such as a phase lock loop from a slow mode of operation to a fast mode of operation, or vice versa. The method 600 then proceeds to step 640.

At step 640, the method waits for the vertical synchronization pulse to end. When the vertical SYNC pulse ends, the end time of the vertical synchronization pulse is determined at step 650.

At step 655, the ending time of the most recent vertical SYNC pulse calculated at step 650 is compared to the end time of the immediately preceding vertical SYNC pulse. That is, at step 655, the difference in ending times of the two most recently received vertical SYNC pulses is calculated. If this difference exceeds a threshold level, then a change in vertical SYNC pulse timing is deemed to have occurred, and the method 600 proceeds to step 660. If no change has occurred, then the method proceeds to step 665.

At step 660, the system responds to changes deemed to have occurred in the vertical SYNC pulses in a manner similar to that discussed above with respect to step 630. The method 600 then proceeds to step 665.

At step 665, the method returns to the horizontal SYNC analysis routine 500 described above with respect to FIG. 5.

Figure 7:
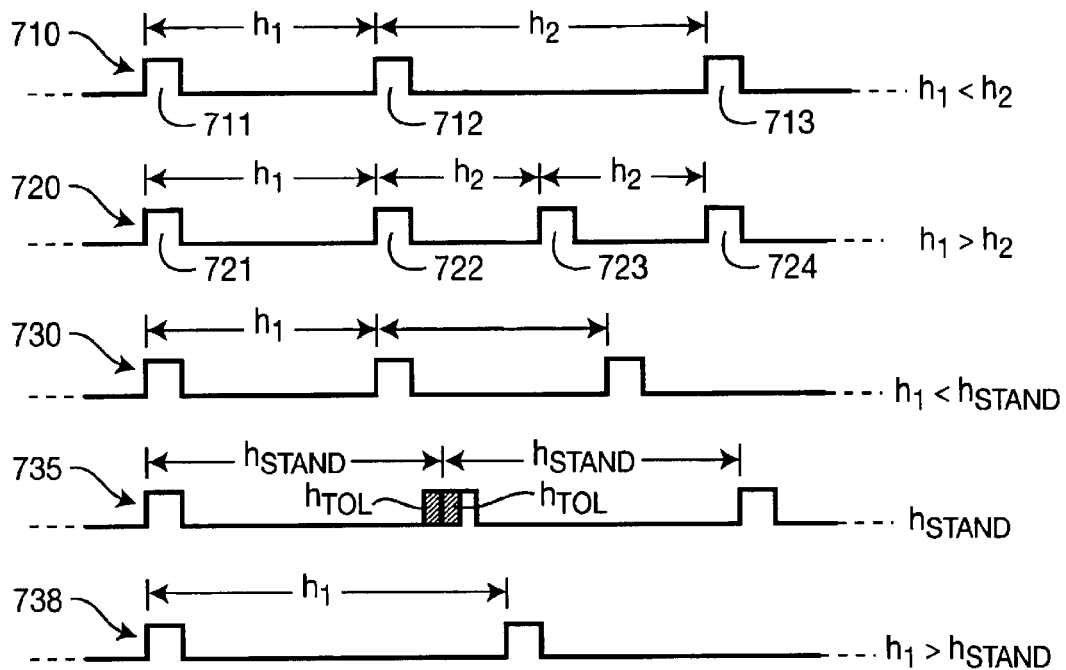
FIGS. 7 and 8 depict a plurality of timing diagrams useful in understanding the present invention.

FIG. 7 depicts a plurality of timing diagrams useful in understanding the present invention. Specifically, a first timing diagram 710 depicts three horizontal SYNC pulses 711–713, where a first horizontal timing interval $h_1$ is defined by the time separating the leading edges of first pulse 711 and second pulse 712. A second horizontal timing interval $h_2$ is defined by the time separating the leading edges of second pulse 712 and third pulse 713. In the first timing diagram 710, it can be seen that first horizontal timing interval $h_1$ is less than second horizontal timing interval $h_2$. For the purposes of this discussion, the case where $h_1$ is less than $h_2$ will be denoted as mode one operation. As previously noted, timing intervals and/or pulse widths associated with horizontal synchronizing pulses (and vertical synchronizing pulses) may change due to changes in source material, the selection of VCR trick modes of operation (e.g., fast forward, fast play, rewind and the like), stretched video tape and the like.

A second timing diagram 720 depicts four horizontal SYNC pulses 721–724, where a first horizontal timing interval $h_1$ is defined by the time separating the leading edges of the first 721 and second 722 pulses, while a plurality of second horizontal timing intervals $h_2$ are defined by the time separating the leading edges of each of the remaining three pulses 722, 723, 724. In the second timing diagram 720, $h_1$ is greater than $h_2$. For purposes of this discussion, the case where $h_1$ is greater than $h_2$ will be referred to as mode two operation.

A third timing diagram comprises three related diagrams 730, 735 and 738. Timing diagram 735 depicts a standard horizontal timing diagram where a plurality of horizontal SYNC pulses are separated by a standard horizontal SYNC pulse timing interval $h_{STAND}$. Timing diagram 730 depicts a plurality of horizontal SYNC pulses separated by timing intervals $h_1$ that are less than the standard horizontal duration $h_{STAND}$. Timing diagram 738 depicts a plurality of horizontal SYNC pulses separated by horizontal timing intervals $h_1$ that are greater than the standard horizontal timing period $h_{STAND}$.

It is noted that a horizontal timing interval tolerance $h_{TOL}$ of approximately one half the width of a horizontal SYNC pulse is shown as shaded areas proximate the leading edge of the second SYNC pulse in timing diagram 735. This tolerance may be used to define a threshold level within which a corresponding horizontal timing interval (e.g., $h_1$) is deemed to be equivalent to the standard horizontal duration $h_{STAND}$. It will be appreciated that this tolerance level $h_{TOL}$ may be increased or decreased as necessary to define wider or narrower duration ranges deemed to be equivalent to the standard duration $H_{STAND}$.

Figure 8:
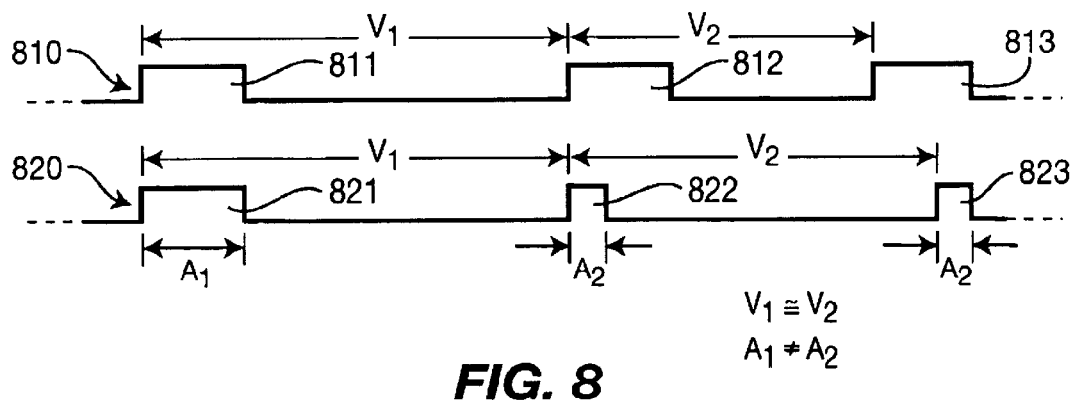

FIG. 8 depicts a plurality of timing diagrams useful in understanding the present invention. Specifically, a first timing diagram 810 depicts three vertical SYNC pulses 811, 812 and 813, where a first vertical timing interval $V_1$ is defined by the time separating the leading edges of first pulse 811 and second pulse 812. A second vertical timing interval $V_2$ is defined by the time separating the leading edges of the second pulse 812 and third pulse 813. In the first timing diagram 810, it can be seen that the first vertical timing interval $V_1$ is greater than the second vertical timing interval $V_2$ (i.e., $V_1$ does not equal $V_2$). In this case, changes in vertical timing intervals may be indicative of changes in source material.

A second timing diagram 820 depicts three vertical SYNC pulses 821, 822 and 823, where first $V_1$ and second $V_2$ timing intervals are defined in the same manner as first timing diagram 810. However, it is noted that first vertical SYNC pulse 821 has a pulse width of $A_1$, while second 822 and third 823 vertical SYNC pulses have pulse widths of $A_2$. It can be seen that pulse width $A_1$ is greater than pulse width $A_2$ (i.e., $A_1$ is not equal to $A_2$). Thus, this difference in pulse widths, if exceeding a threshold level, may be construed as being indicative of a change in source material.

The system initially places the decoder or other device under control)into an acquire mode whereby its horizontal PLL loop (e.g., PLL 190) is in fast track mode. Upon acquiring a lock, if the system determines that the video is likely to be from a VCR or similar device, the system then places the PLL into a slow track mode to ensure that the decoder is placed back into the acquire mode should the video source change.

It is assumed that for the most part, video sources are asynchronous to each other. Thus, it is possible to detect a change in video sources or the use of a track mode in a VCR or DVD player by examining either horizontal or vertical synch timing.

Although various embodiments which incorporate the teachings of the present invention have been shown and described in detail herein, those skilled in the art can readily devise many other varied embodiments that still incorporate these teachings.

What is claimed is:

1. Apparatus, comprising:
   a timer, for associating temporal information with each of a sequence of received synchronization pulses;
   a first differencer, for measuring temporal differences between successive synchronization pulses to determine respective synchronization pulse timing intervals;
   a second differencer, for measuring temporal differences between successive synchronization pulse timing intervals; and
   a comparator, for producing a control signal indicative of whether differences between successive synchronization pulse timing intervals exceed a threshold level.

2. The apparatus of claim 1, wherein said first differencer comprises:
   a first memory element, for storing temporal information associated with a first synchronization pulse;
   a second memory element, for storing temporal information associated with a second synchronization pulse, said first and second synchronization pulses being successive; and
   a subtractor, for determining a difference between temporal information stored within said first and second memory elements.

3. The apparatus of claim 2, wherein said memory elements comprise latches.

4. The apparatus of claim 3, wherein said timer and said latches are sequentially enabled according to said sequence of received synchronization pulses.

5. The apparatus of claim 2, wherein said second differencer comprises:
   a third memory element, for storing temporal information associated with a first synchronization pulse timing interval;
   a fourth memory element, for storing temporal information associated with a second synchronization pulse timing interval; and
   a second subtractor, for determining a difference between temporal information stored within said third and fourth memory elements.

6. The apparatus of claim 5, wherein said first and second synchronization pulse timing intervals are successive.

7. The apparatus of claim 1 wherein said synchronizing pulses comprise at least one of horizontal synchronizing pulses and vertical synchronizing pulses.

8. The apparatus of claim 1, wherein said synchronization pulses comprise vertical synchronization pulses and said apparatus is adapted to measure the pulse width of successive vertical synchronization pulses to identify changes therein.

9. The apparatus of claim 8, wherein said control signal produced by said comparator indicates whether said vertical synchronization pulse width difference is below a threshold level.

10. A method, comprising:
    associating temporal information with each of a sequence of received synchronization pulses;
    measuring temporal differences between successive synchronization pulses to determine respective synchronization pulse timing intervals;
    measuring temporal differences between successive synchronization pulse timing intervals; and
    providing indicia of whether differences between successive synchronization pulse timing intervals exceed a threshold level.

11. The method of claim 10, wherein said first step of measuring comprises:
    storing, in a first memory element, temporal information associated with a first synchronization pulse;
    storing, in a second memory element, temporal information associated with a second synchronization pulse, said first and second synchronization pulses being successive; and
    determining a difference between said temporal information stored within said first and second memory elements.

12. The method of claim 11, wherein said memory elements comprise latches.

* * * * *